United States Patent [19]

Pöllinger

[11] 4,073,218

[45] Feb. 14, 1978

[54] ACTUATING CYLINDER FOR A MAGNETIC RAIL BRAKE UNIT

[75] Inventor: Hans Pöllinger, Munich, Germany

[73] Assignee: Knorr-Bremse GmbH, Munich, Germany

[21] Appl. No.: 712,072

[22] Filed: Aug. 5, 1976

[30] Foreign Application Priority Data

Aug. 8, 1975 Germany .......................... 2535524

[51] Int. Cl.2 .......................... F01B 11/02; F16J 11/02

[52] U.S. Cl. .......................... 92/85 R; 92/165 R; 92/169; 92/182

[58] Field of Search .............. 92/64, 85 R, 85 A, 182, 92/165 R, 168, 108, 107, 169; 91/392

[56] References Cited

U.S. PATENT DOCUMENTS

| | | | |
|---|---|---|---|
| 2,879,986 | 3/1959 | Maier | 92/85 R |
| 3,202,059 | 8/1965 | Ottestod et al. | 91/392 |
| 3,335,643 | 8/1967 | Wentworth | 92/182 |
| 3,496,840 | 2/1970 | Wandel et al. | 92/85 R |
| 3,515,438 | 6/1970 | Stevenson et al. | 92/64 |

*Primary Examiner*—Paul E. Maslousky

*Attorney, Agent, or Firm*—Edmund M. Jaskiewicz

[57] ABSTRACT

An actuating cylinder for a magnetic rail brake unit on a vehicle has a piston slidable within a cylinder and the piston has an end position at the head end of the cylinder. A pair of concentric conical mating surfaces are provided on the piston and cylinder head end so as to be engageable with each other to stop the piston in the end position.

2 Claims, 2 Drawing Figures

ACTUATING CYLINDER FOR A MAGNETIC RAIL BRAKE UNIT

Figure 1:
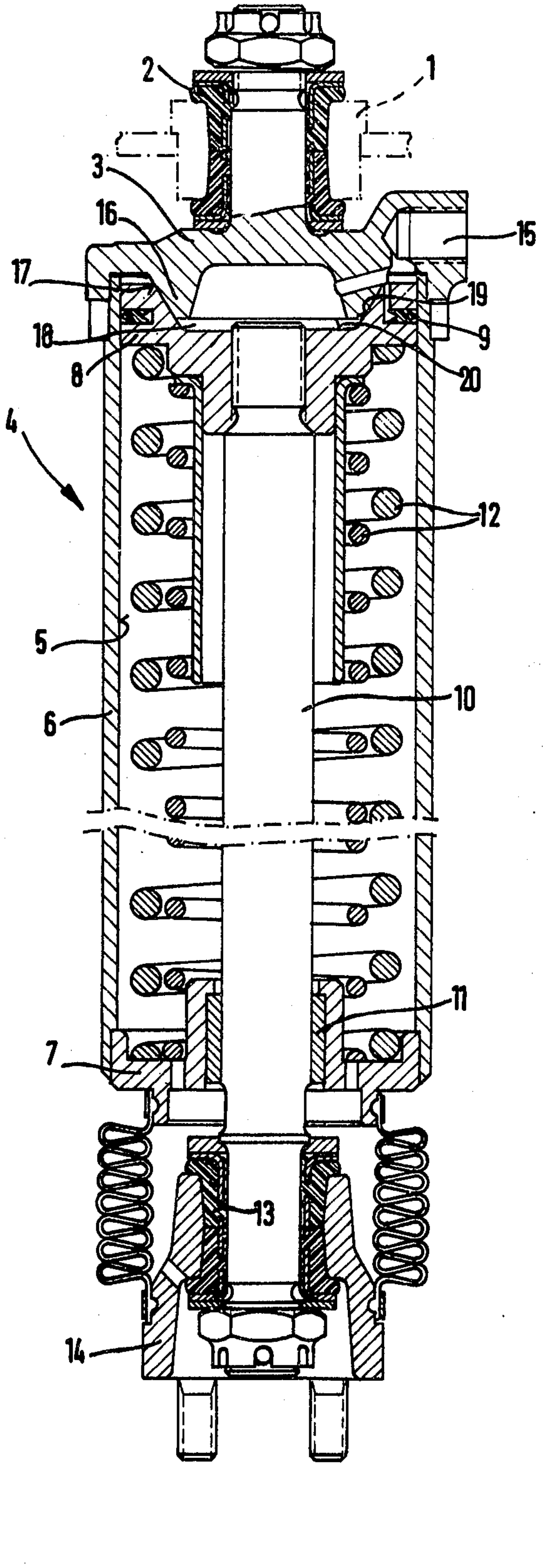

The present invention relates to an actuating cylinder for a magnetic rail brake unit on a vehicle, more particularly, to the stop structure between the piston and cylinder head when the piston is in its raised end position.

Rail vehicles in particular have been provided with magnetic rail brakes wherein the magnetic brake unit is held in an inoperative position in which the unit is positioned above the rail. In order to apply the brakes, an actuating device in the form of a fluid pressure motor is actuated to move the magnetic brake unit downwardly into contact with the rail. The actuating device generally comprises a cylinder mounted on the frame and a piston extending from the cylinder is connected to the brake unit.

In such a lifting cylinder, the piston is in its upper end position against the cylinder head to retain the magnetic brake unit in its raised or inoperative position. The piston is retained in this end position by a spring and there is no pressure exerted by a fluid pressure medium against the piston. The end position of the piston is generally determined by a stop plate of resilient material which is recessed into the end surface of the piston and contacts the inner surface of the cylinder head in the end position of the piston. This resilient plate damps the impact of the piston against the cylinder head when the magnetic brake unit is lifted and the cylinder is moved to its upper end position under the action of the spring.

During travel of the vehicle, numerous transverse forces are transmitted between the piston and the inner surface of the cylinder upon which the piston slides. These forces are generally functions of lateral accelerations, shocks and impacts of the vehicle. The magnetic brake unit is also subjected to oscillations as it is suspended from the piston rod which is slidably guided at the bottom end of the cylinder. As a result of these forces, excessive wear of the cylinder inner surface in the zone of the piston end position may occur and this in turn may cause a deterioration of the fluid-tight seal between the periphery of the piston and the inner surface of the cylinder.

It has been proposed to provide a suspension device for magnetic rail brake units wherein a bellows is provided which is filled with air under pressure, the bellows being employed instead of a cylinder-piston unit. However, such a bellows had the disadvantage that it was extremely soft and flexible in a direction transverse to its axis and as a result frequent oscillation of the magnetic brake unit in its raised position occurred. It was proposed to minimize such oscillations by providing mating conical surfaces between the magnetic brake unit and the vehicle frame.

It is therefore the principal object of the present invention to provide an actuating cylinder for a magnetic rail brake unit having an improved stop structure between the cylinder and piston when the piston is in its raised end position.

It is another object of the present invention to provide such an actuating cylinder wherein the effects of transverse forces and lateral accelerations upon the piston when in its raised position are minimized.

It is a further object of the present invention to provide such an actuating cylinder wherein the piston is so retained in its raised end position that no wear is produced between the piston and cylinder at this end position and no adverse effects result upon the fluid seal between the piston and cylinder.

According to one aspect of the present invention a fluid pressure device for actuating a magnetic rail brake unit on a vehicle may comprise a cylinder having a head end and a piston slidable within the cylinder. The piston has an end position at the head end of the cylinder. A pair of concentric conical mating surfaces are provided on the piston and cylinder head end engageable with each other so as to stop the piston in this end position. The stop surfaces may comprise a conical projection on the cylinder head and a conical recess in the end of the piston.

As a result of this structure when the piston is in its end position the transverse forces and lateral accelerations will not interact between the piston and the inner surface of the cylinder but will interact between the piston and the cylinder head through the stop surfaces. Accordingly, the piston will not exert a lateral load upon the inner surface of the cylinder and wear of the cylinder inner surface will be kept to a minimum.

Figure 2:
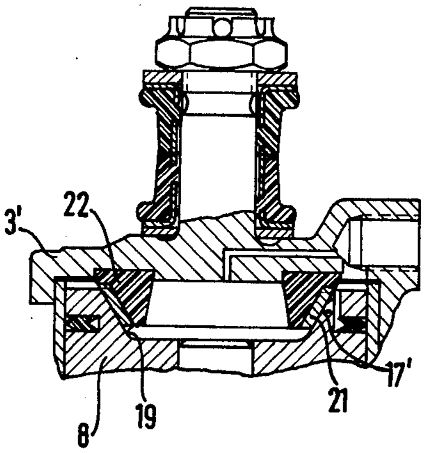

Other objects and advantages of the present invention will be apparent upon reference to the accompanying description when taken in conjunction with the following drawings, which are exemplary, wherein;

FIG. 1 is a longitudinal sectional view of a lifting cylinder for a magnetic rail brake unit incorporating the present invention; and FIG. 2 is a view of the head end portion of the cylinder of FIG. 1 but showing a modification of the stop surfaces.

Proceeding next to the drawings wherein like reference symbols indicate the same parts throughout the various views a specific embodiment and modifications of the present invention will be described in detail.

As may be seen in FIG. 1, a fluid pressure device comprises an actuating cylinder indicated generally at 4 and mounted in a vehicle frame a portion of which is indicated at 1 by means of an intermediate sleeve 2 of resilient material at the head end 3 of the cylinder. The cylinder head 3 is rigidly and sealingly secured to a cylindrical body 6 having a cylindrical travel track 5 on its inner surface and sealed at its other end by a cylinder bottom member or casting 7.

A piston 8 is displaceably guided within the cylinder 6 upon the cylindrical inner surface 5 by means of a piston sealing ring 9 inserted into an annular groove formed in the peripheral surface of the piston. A piston rod 10 extends from the piston 8 to slidably project to the exterior of the cylinder through a bore formed in the cylinder bottom end 7 having a slide bearing or packing 11 therein. Springs 12 are positioned under tension between the piston 8 and the cylinder bottom end 7 so as to urge the piston 8 against the cylinder head 3. At the free end of the piston rod 10 which is outwardly of the cylinder there is mounted an intermediate sleeve 13 of resilient material about which is positioned a retaining element 14 which is connected to a rail brake magnetic unit (not shown) as known in the art.

The cylinder head end 3 is provided with a connection 15 to a source of a pressure medium which may be compressed air. On the inner surface of the cylinder head end 3 and concentric to the cylinder member 6 there is a projection 16 which has a conical cross-section and on its outer surface is provided with a tapering or conical stop surface 17. The end of the piston 8 facing toward the cylinder head end 3 is provided with a concentric recess 18 the wall of which 19 forms a conical stop surface which conforms in shape with the stop surface 17 and mates therewith. The stop surfaces 17 and 19 define an angle of approximately 30° with the longitudinal axis of the cylinder. This particular taper or angle of the stop surfaces 17 and 19 reliably prevents any possibility of jamming between the piston 8 and the head end 3 of the cylinder and at the same time provides for precise and accurate centering of the cylinder 8 when it is in its head end position as shown in FIG. 1.

The recess 18 extends axially into the piston 8 such a distance that the bottom of the recess indicated at 20 is located approximately in a radial plane in which is positioned the piston ring 9. This relationship not only provides for an adequate depth of the recess 18 but maintains the strength of the piston 8 by removing only a minimum amount of material from the piston to form the stop surface 19.

In order to reduce the specific surface pressure between the stop surfaces 17 and 19, the recess 18 and the projection 16 are provided with the largest possible diameter. The diameter of the recess 18 at its outer end facing toward the cylinder head 3 is substantially equal to the inner diameter of the piston ring 9.

When the magnetic rail brake is in its raised or inoperative position, the piston 8 (as shown in FIG. 1) is acted upon by the springs 12 to be retained in its upper end position in which the conical stop surfaces 17 and 19 engage each other and retain the piston 8 concentrically with respect to the cylinder member 6. If any lateral forces or transverse accelerations should occur, these forces and accelerations are transmitted by means of the stop surfaces 17 and 19 between the cylinder head 3 and the piston 8. Thus, such forces or accelerations will not cause the piston 8 to impact unilaterally upon the inner surface 5 of the cylinder. As a result, the cylindrical inner surface 5 is protected from such shocks and impacts and is not unduly worn or flattened. As a result, the lifting cylinder 4 is thus capable of long operating life in which maintenance and disruption of service are maintained to a minimum.

When a pressure medium is supplied to the actuating cylinder 4 through the connection 15 the piston 8 will be displaced downwardly as viewed in FIG. 1 toward the cylinder bottom end 7. The stop surfaces 17 and 19 will readily separate from each other without any difficulty or without requiring the exertion of any force because of the angle of taper as described above.

As a modification, one of the conical stop surfaces may be resiliently mounted. Such a modification is shown in FIG. 2 wherein the stop surface 17' is formed on the outer surface of a conical metal ring 21 attached to the cylinder 3' by means of an annular member 22 made of a resilient material. The remaining structure corresponds to that illustrated and described in FIG. 1. The resilient mounting of the stop surface 17' resulting from the resilient annular member 22 damps impact of the stop surface 19 of the piston 8. This further damping provided by the annular member 22 further contributes to protection of the individual components of the actuating cylinder 4.

The annular member 2 is secured to the inner surface of the head end 3' by means known in the art.

It will be understood that this invention is susceptible to modification in order to adapt it to different usages and conditions, and accordingly, it is desired to comprehend such modifications within this invention as may fall within the scope of appended claims.

What is claimed is:

1. A fluid pressure device for actuating a magnetic rail brake unit on a vehicle comprising a cylinder having a head end, a piston slidable within said cylinder and having an end position at said head end, a projection on said cylinder head extending toward said piston and having a first conical stop surface thereon, said piston having a recess therein conforming to said projection and having a second conical stop surface thereon, said first and second stop surfaces defining a pair of concentric conical mating surfaces engagable with each other to stop the piston in said end position, said stop surfaces being at an angle of substantially 30° with respect to the longitudinal axis of the cylinder, said piston having a sealing ring around its periphery to define a radial plane, said piston recess having a bottom surface located substantially in said radial plane, said piston recess having an opening of a diameter which is substantially equal to the inner diameter of said piston ring.

2. A fluid pressure device as claimed in claim 1 and means for resiliently mounting at least one of said stop surfaces.

* * * * *